United States Patent
Murata et al.

(10) Patent No.: US 10,634,191 B2
(45) Date of Patent: Apr. 28, 2020

(54) CAGE AND ROLLER ASSEMBLY

(71) Applicant: JTEKT CORPORATION, Osaka-shi, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/359,648

(22) Filed: Mar. 20, 2019

(65) Prior Publication Data
US 2019/0301532 A1    Oct. 3, 2019

(30) Foreign Application Priority Data
Mar. 27, 2018  (JP) .................. 2018-059683

(51) Int. Cl.
*F16C 33/46* (2006.01)
*F16C 19/26* (2006.01)

(52) U.S. Cl.
CPC ............ *F16C 33/467* (2013.01); *F16C 19/26* (2013.01); *F16C 2361/61* (2013.01)

(58) Field of Classification Search
CPC ............... F16C 33/4676; F16C 33/467; F16C 33/4635–4664; F16C 33/4629; F16C 33/4623; F16C 33/4617
See application file for complete search history.

(56) References Cited

U.S. PATENT DOCUMENTS

| | | | | |
|---|---|---|---|---|
| 1,963,407 A * | 6/1934 | Herrmann | ............... | F16C 19/26 384/573 |
| 5,647,674 A * | 7/1997 | Ohashi | ............... | F16C 33/4629 384/575 |
| 5,772,338 A * | 6/1998 | Hillmann | ............ | F16C 33/4605 384/470 |
| 5,803,620 A * | 9/1998 | Yokota | ................ | F16C 33/4629 384/580 |
| 8,602,657 B2 * | 12/2013 | Brown | .................. | F16C 33/546 384/572 |
| 2015/0292557 A1 * | 10/2015 | Wey | ..................... | F16C 33/4676 384/575 |

FOREIGN PATENT DOCUMENTS

JP        2009-008139 A        1/2009

* cited by examiner

*Primary Examiner* — Phillip A Johnson
(74) *Attorney, Agent, or Firm* — Oliff PLC

(57) ABSTRACT

A cage and roller assembly includes rollers to be brought into rolling contact with a raceway surface provided on the outer periphery of a shaft, and an annular cage that retains the rollers. Lubricating oil is supplied through an oil supply hole that is provided inside the shaft and is open at an axial center region of the raceway surface. The cage includes annular portions having guide surfaces that are brought into contact with an inner peripheral surface of an outer member that is brought into rolling contact with the rollers, and cage bars that couple the annular portions together and are arranged with intervals in a circumferential direction. Clearances formed between the cage bars and the rollers housed in the pockets are larger in axial center portions of the cage bars between axial ends of the cage bars than at the axial ends of the cage bars.

13 Claims, 9 Drawing Sheets

CAGE AND ROLLER ASSEMBLY

INCORPORATION BY REFERENCE

The disclosure of Japanese Patent Application No. 2018-059683 filed on Mar. 27, 2018 including the specification, drawings and abstract, is incorporated herein by reference in its entirety.

BACKGROUND OF THE INVENTION

1. Field of the Invention

The present invention relates to a cage and roller assembly including a plurality of rollers and an annular cage that retains the rollers.

2. Description of the Related Art

There is known a transmission including a planetary gearing mechanism in, for example, automobiles. FIG. 9 is a sectional view illustrating a planetary gear 90 provided in the planetary gearing mechanism, and a support structure 100 for the planetary gear 90. The support structure 100 includes a carrier (support member) 91 and a cage and roller assembly 92. The carrier 91 includes a disc-shaped body 93, a shaft 94, and a retaining member 95. A base 94a of the shaft 94 is fixed to the body 93. The retaining member 95 is attached to a tip 94b of the shaft 94. The annular planetary gear 90 is provided between the body 93 and the retaining member 95. The planetary gear 90 rotates about the shaft 94. In order to smooth the rotation, the cage and roller assembly 92 is provided between the planetary gear 90 and the shaft 94 (see, for example, Japanese Patent Application Publication No. 2009-8139 (JP 2009-8139 A)). The cage and roller assembly 92 includes a plurality of rollers 96 and an annular cage 97. The rollers 96 are brought into rolling contact with a raceway surface 94c provided on the outer periphery of the shaft 94. The cage 97 retains the rollers 96.

When the planetary gear 90 rotates, the rollers 96 are brought into rolling contact with the raceway surface 94c provided on the outer periphery of the shaft 94, and with a raceway surface 90c provided on the inner periphery of the planetary gear 90. With this structure, the cage 97 rotates together with the rollers 96. At this time, an outer peripheral surface 101a of an annular portion 101 of the cage 97 is brought into sliding contact with an inner peripheral surface 90d of the planetary gear 90. The cage 97 is thus guided by the planetary gear 90 and can rotate stably along the inner peripheral surface 90d. Since the cage 97 is guided by the outer peripheral surface 101a of the annular portion 101, the outer peripheral surface 101 is considered as a guide surface.

In the planetary gearing mechanism illustrated in FIG. 9, the cage and roller assembly 92 is supplied with lubricating oil through an oil supply hole 99 that is provided inside the shaft 94 and is open at an axial center region of the raceway surface 94c.

As described above, the outer peripheral surface 101a of the annular portion 101 of the cage 97, that is, the guide surface, is brought into sliding contact with the inner peripheral surface 90d of the planetary gear 90. In this view, it is necessary to supply the lubricating oil to the space between the guide surface and the inner peripheral surface 90d of the planetary gear 90. As illustrated in FIG. 9, however, the lubricating oil is supplied to the cage and roller assembly 92 from the shaft 94 side on the inner periphery thereof. Therefore, the lubricating oil is less likely to reach the guide surface (outer peripheral surface 101a) of the annular portion 101, which may cause lack of lubricating oil.

SUMMARY OF THE INVENTION

It is one object of the present invention to facilitate lubricating oil supplied from the inner peripheral side of the cage and roller assembly to be supplied to the outer peripheral side of the cage and roller assembly.

A cage and roller assembly according to one aspect of the present invention has the following features in its structure. That is, the cage and roller assembly includes a plurality of rollers and an annular cage. The rollers are brought into rolling contact with a raceway surface provided on an outer periphery of a shaft. The cage retains the rollers. The cage and roller assembly is supplied with lubricating oil through an oil supply hole that is provided inside the shaft and is open at an axial center region of the raceway surface. The cage includes a pair of annular portions and a plurality of cage bars. The pair of annular portions has guide surfaces that can be brought into contact with an inner peripheral surface of an outer member that is brought into rolling contact with the rollers. The cage bars couple the pair of annular portions together and are arranged with intervals in a circumferential direction. The rollers are housed in pockets each formed between the pair of annular portions and between the cage bars that are adjacent to each other in the circumferential direction. Clearances formed between the cage bars and the rollers housed in the pockets are larger in axial center portions of the cage bars between axial ends of the cage bars than at the axial ends of the cage bars.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
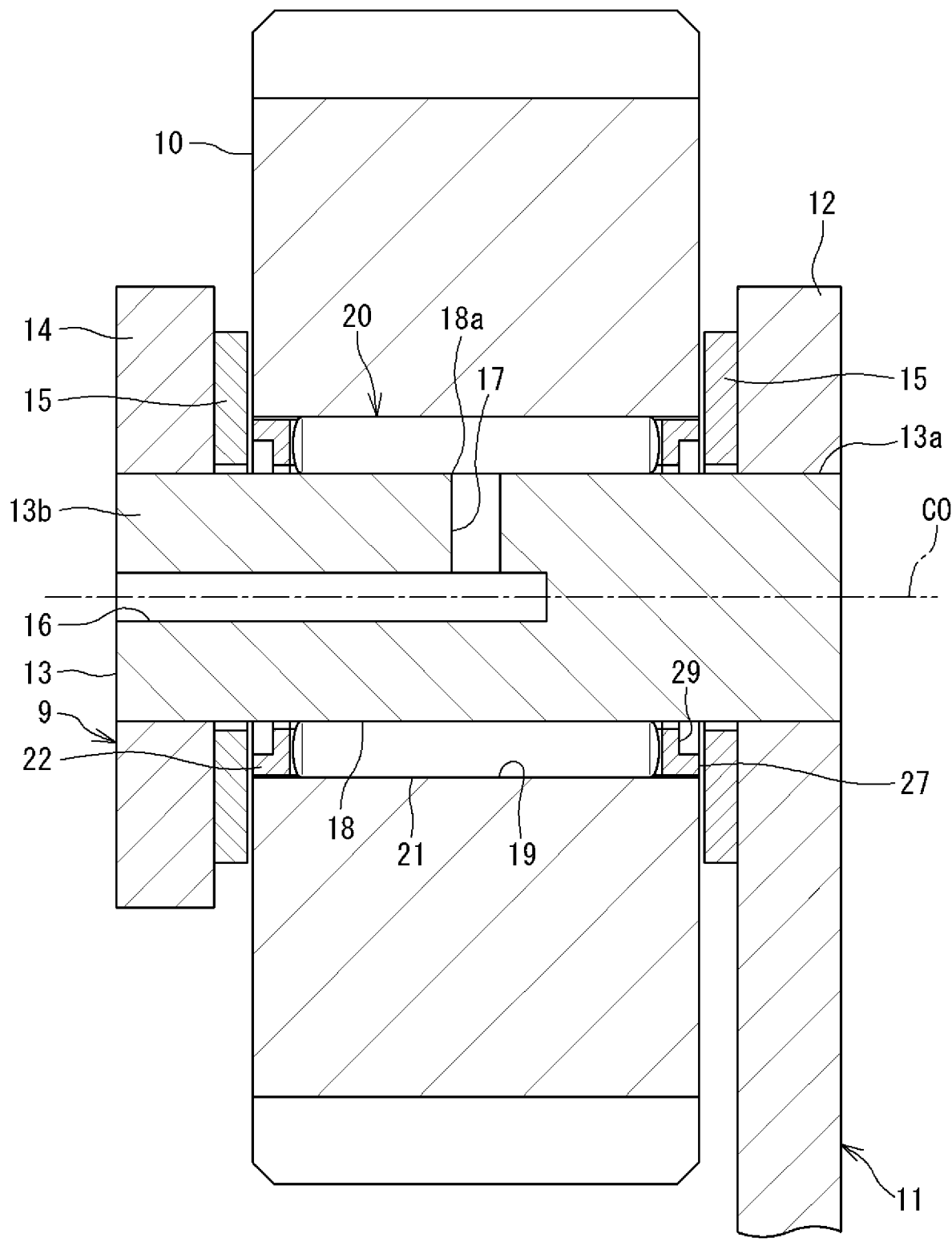
FIG. 1 is a sectional view illustrating a planetary gear and a support structure for the planetary gear.

A cage and roller assembly of the present invention is applied to various rotary devices. A cage and roller assembly 20 in the form described herein is included in a support structure 9 that supports a planetary gear 10 provided in a planetary gearing mechanism. FIG. 1 is a sectional view illustrating the planetary gear 10 and the support structure 9 for the planetary gear 10.

The support structure 9 includes a carrier (support member) 11 and the cage and roller assembly 20. The carrier 11 includes a disc-shaped body 12, a shaft 13, and a retaining member 14. The shaft 13 has a circular shape in cross section. A base 13a of the shaft 13 is fixed to the body 12. The retaining member 14 is attached to a tip 13b of the shaft 13. The annular planetary gear 10 is provided between the body 12 and the retaining member 14. The planetary gear 10 rotates about the shaft 13. In order to smooth the rotation, the cage and roller assembly 20 is provided between the planetary gear 10 and the shaft 13. A central axis of the cage and roller assembly 20 coincides with a central axis of the shaft 13. The shaft 13 is a linear member having a fixed shape in cross section along an axial direction. In this embodiment, the "axial direction" is a direction along a central axis C0 of the cage and roller assembly 20 (shaft 13). Any direction parallel to the central axis C0 is also referred to as the axial direction.

The cage and roller assembly 20 includes a plurality of rollers 21 and an annular cage 22. The cage 22 retains the rollers 21. The axial dimensions of the planetary gear 10 and the cage 22 are substantially equal to each other. A side washer 15 is provided between the body 12 and each of the cage and roller assembly 20 and the planetary gear 10. Another side washer 15 is provided between the retaining member 14 and each of the cage and roller assembly 20 and the planetary gear 10. The side washer 15 is a mating member where a face 27 of the cage 22 may be brought into contact.

The shaft 13 is provided with a first hole 16 and a second hole 17. The first hole 16 extends in the axial direction. The second hole 17 extends in a radial direction from a part of the first hole 16. The second hole 17 is open at the outer peripheral surface of the shaft 13. The outer peripheral surface of the shaft 13 includes a raceway surface 18. The rollers 21 are brought into rolling contact with the raceway surface 18. The raceway surface 18 is hereinafter referred to as "inner raceway surface 18". The inner peripheral surface of the planetary gear 10 serves as a raceway surface 19. The rollers 21 are brought into rolling contact with the raceway surface 19. The raceway surface 19 is hereinafter referred to as "outer raceway surface 19". Although illustration is omitted, a tubular member (bush) may be provided on the inner periphery of the planetary gear 10. In this case, the inner peripheral surface of the tubular member serves as the outer raceway surface 19. The first hole 16 is supplied with lubricating oil. The lubricating oil flows through the second hole 17, and is supplied to the cage and roller assembly 20 through an opening 18a on the inner raceway surface 18 of the shaft 13. The lubricating oil is used for lubricating the cage and roller assembly 20. That is, the cage and roller assembly 20 is supplied with the lubricating oil through oil supply holes (first hole 16 and second hole 17) that are provided inside the shaft 13 and are open at the inner raceway surface 18. The second hole 17 (opening 18a) is open at an axial center region of the inner raceway surface 18. The axial center region is located at the same position in the axial direction as that of an axial center portion of the cage and roller assembly 20.

As described above, the cage and roller assembly 20 includes the rollers 21 and the cage 22. The cage and roller assembly 20 of this embodiment does not include an inner ring and an outer ring that are provided in a general rolling bearing (for example, a cylindrical roller bearing). When the cage and roller assembly 20 rotates, the rollers 21 are brought into rolling contact with the inner raceway surface 18 provided on the outer periphery of the shaft 13 and the outer raceway surface 19 provided on the inner periphery of the planetary gear 10. Although illustration is omitted, the cage and roller assembly of the present invention may have a structure including the outer ring.

Figure 2:
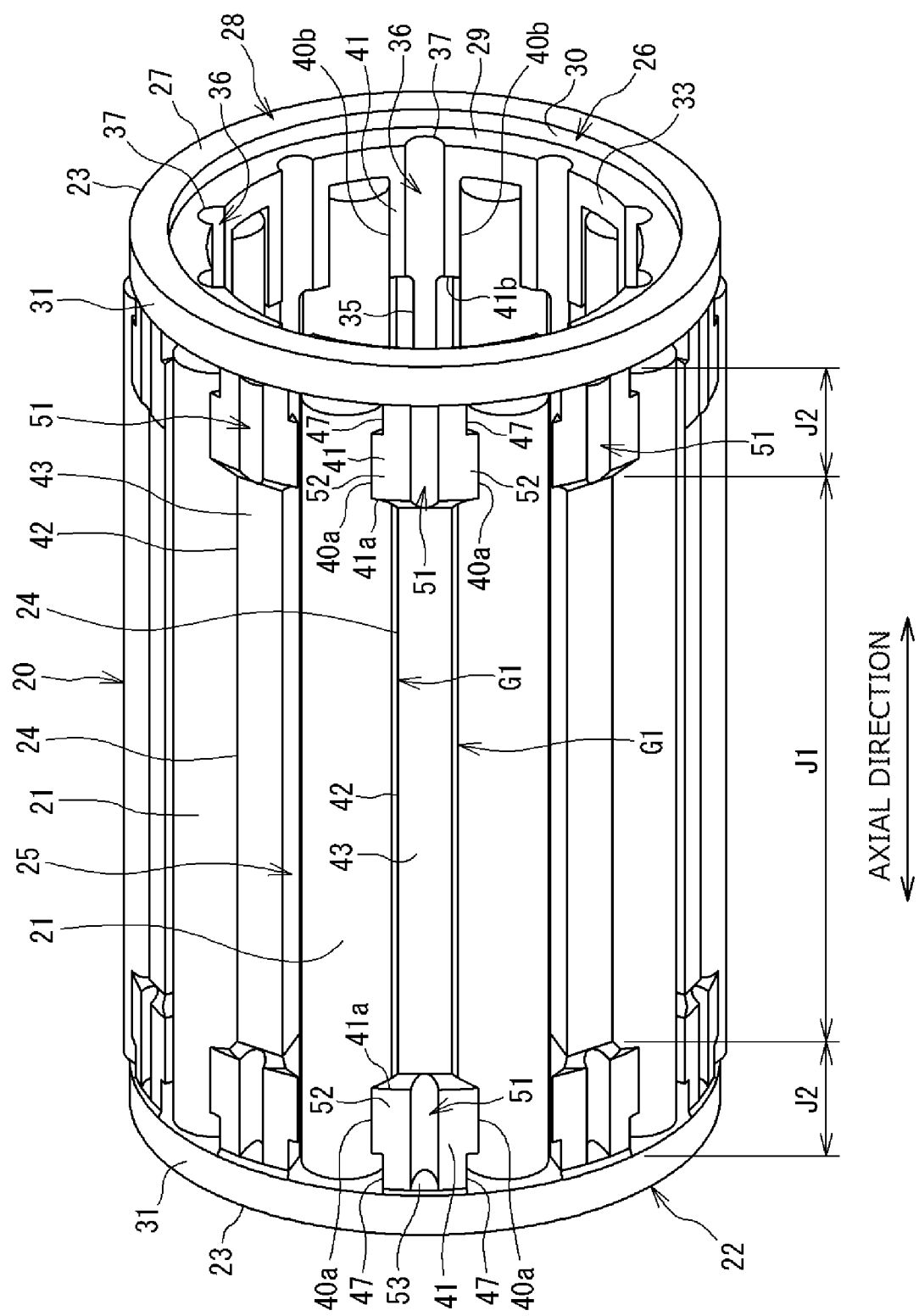
FIG. 2 is a perspective view of a cage and roller assembly.

FIG. 2 is a perspective view of the cage and roller assembly 20 illustrated in FIG. 1. The roller 21 is a needle roller having a shape of an elongated column. The cage 22 includes a pair of annular portions 23 and 23 and a plurality of cage bars 24. The annular portions 23 and 23 are provided away from each other in the axial direction. The cage bars 24 are arranged with intervals in a circumferential direction, and couple the annular portions 23 and 23 together. Pockets 25 are each provided between the annular portions 23 and 23 and between circumferentially adjacent cage bars 24 and 24. One roller 21 is housed in each pocket 25. The roller 21 is formed of steel (for example, bearing steel). The cage 22 is formed of a resin (for example, a polyphenylene sulfide resin: PPS).

Figure 3:
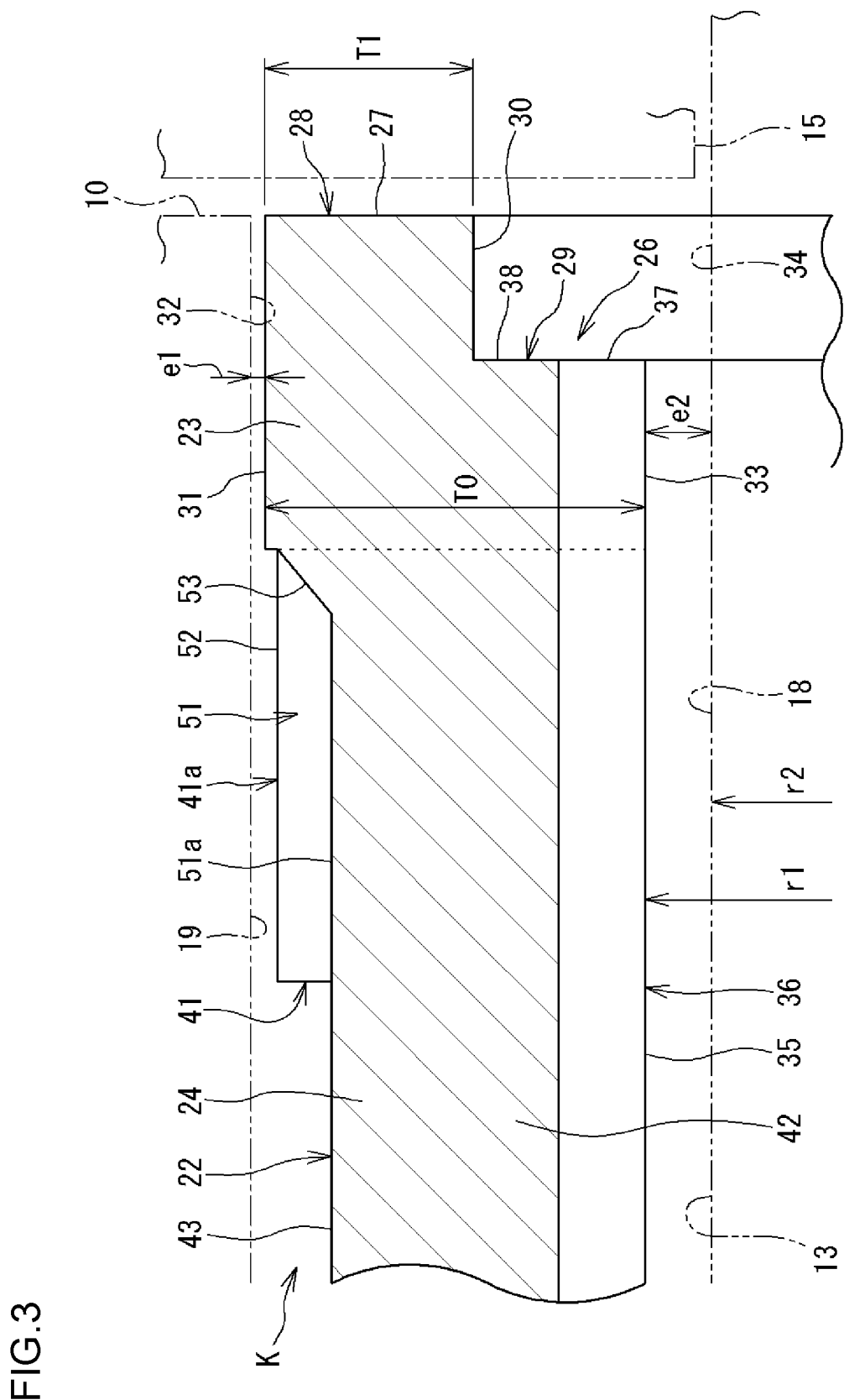
FIG. 3 is a sectional view illustrating a part of a cage.

The annular portion 23 on one side in the axial direction and the annular portion 23 on the other side in the axial direction are symmetrical on the right and left (one side and the other side in the axial direction) but have the same shape. All the cage bars 24 have the same shape as well. In each annular portion 23, a side closer to the pocket 25 in the axial direction is referred to as "axially inner side", and a side opposite to the pocket 25 in the axial direction is referred to as "axially outer side". FIG. 3 is a sectional view illustrating a part of the cage 22 (right part in FIG. 2). An annular recess 26 is formed on the axially outer side of the annular portion 23 (right side in FIG. 3). The annular recess 26 is formed on a radially inner side of the annular portion 23. Therefore, the annular portion 23 has an annular protrusion 28 on its radially outer side. The annular recess 26 and the annular protrusion 28 are formed continuously over the entire circumference. The face 27 (first face 27) of the annular protrusion 28 on the axially outer side is a contact surface that may be brought into contact with the side washer 15. A face 29 (second face 29) of the annular recess 26 on the axially outer side is kept out of contact with the side washer 15. Both the first face 27 and the second face 29 are ring-shaped surfaces. A cylindrical surface is provided between the first face 27 and the second face 29. The cylindrical surface is an inner peripheral surface 30 of the annular protrusion 28.

A clearance is provided between the pocket 25 (see FIG. 2) provided in the cage 22 and the roller 21. Therefore, the cage 22 and the roller 21 can slightly be displaced relative to each other in the radial direction. When the cage 22 is displaced in the radial direction in a state in which the cage and roller assembly 20 is attached between the shaft 13 and the planetary gear 10, an outer peripheral surface 31 of each annular portion 23 is brought into contact with an inner peripheral surface 32 (outer raceway surface 19) of the planetary gear 10 (see FIG. 3). An inner peripheral surface 33 of the annular portion 23 cannot be brought into contact with an outer peripheral surface 34 (inner raceway surface 18) of the shaft 13. In order to achieve this structure, a radial clearance e1 formed between the inner peripheral surface 32 of the planetary gear 10 and the outer peripheral surface 31 of the annular portion 23 is set smaller than a radial clearance e2 formed between the inner peripheral surface 33 of the annular portion 23 and the outer peripheral surface 34 of the shaft 13 ($e1<e2$) in a state in which the planetary gear 10 and the cage 22 are arranged concentrically. The clearance e2 is 0.5 millimeters or smaller, and the clearance e1 is smaller than the clearance e2 (0.5 millimeters $e2>e1$). With this structure, the outer peripheral surface 31 of the annular portion 23 is brought into sliding contact with the inner peripheral surface 32 of the planetary gear 10 when the cage and roller assembly 20 rotates. Therefore, the cage 22 can stably rotate along the inner peripheral surface 32 by being guided by the planetary gear 10. That is, the guiding method for the cage 22 of this embodiment is a method in which the cage 22 is guided by a member (planetary gear 10) located on a radially outer side of the cage 22. The cage 22 is guided by the outer peripheral surface 31 of the annular portion 23, and therefore the outer peripheral surface 31 is referred to as "guide surface 31" in the following description.

For example, when an operation of attaching the cage and roller assembly 20 to an inner peripheral side of the planetary gear 10 is performed and when the cage and roller assembly 20 is transported alone, it is necessary that the roller 21 housed in the pocket 25 (see FIG. 2) be prevented from detaching radially outward or radially inward from the pocket 25. In view of this, each cage bar 24 of the cage 22 has detachment preventing portions 41 that prevent the roller 21 from detaching from the pocket 25. The detachment preventing portions 41 are provided on both sides of the cage bar 24 in the axial direction. Each cage bar 24 has a cage bar body 42 between the detachment preventing portions 41 and 41 on both sides in the axial direction. The cage bar body 42 has an oil reservoir bottom face 43 on its radially outer side. The function of the oil reservoir bottom face 43 is described later. In FIG. 2, the axial length of the cage bar body 42 is J1, and the axial length of the detachment preventing portion 41 is J2. The cage bar body 42 is longer in the axial direction than the sum of the axial lengths of the detachment preventing portions 41 located on both sides in the axial direction (J1>2×J2). The detachment of the roller 21 is prevented such that a part of the detachment preventing portion 41 is brought into contact with the end of the roller 21 from the radially outer side or the radially inner side.

Figure 4:
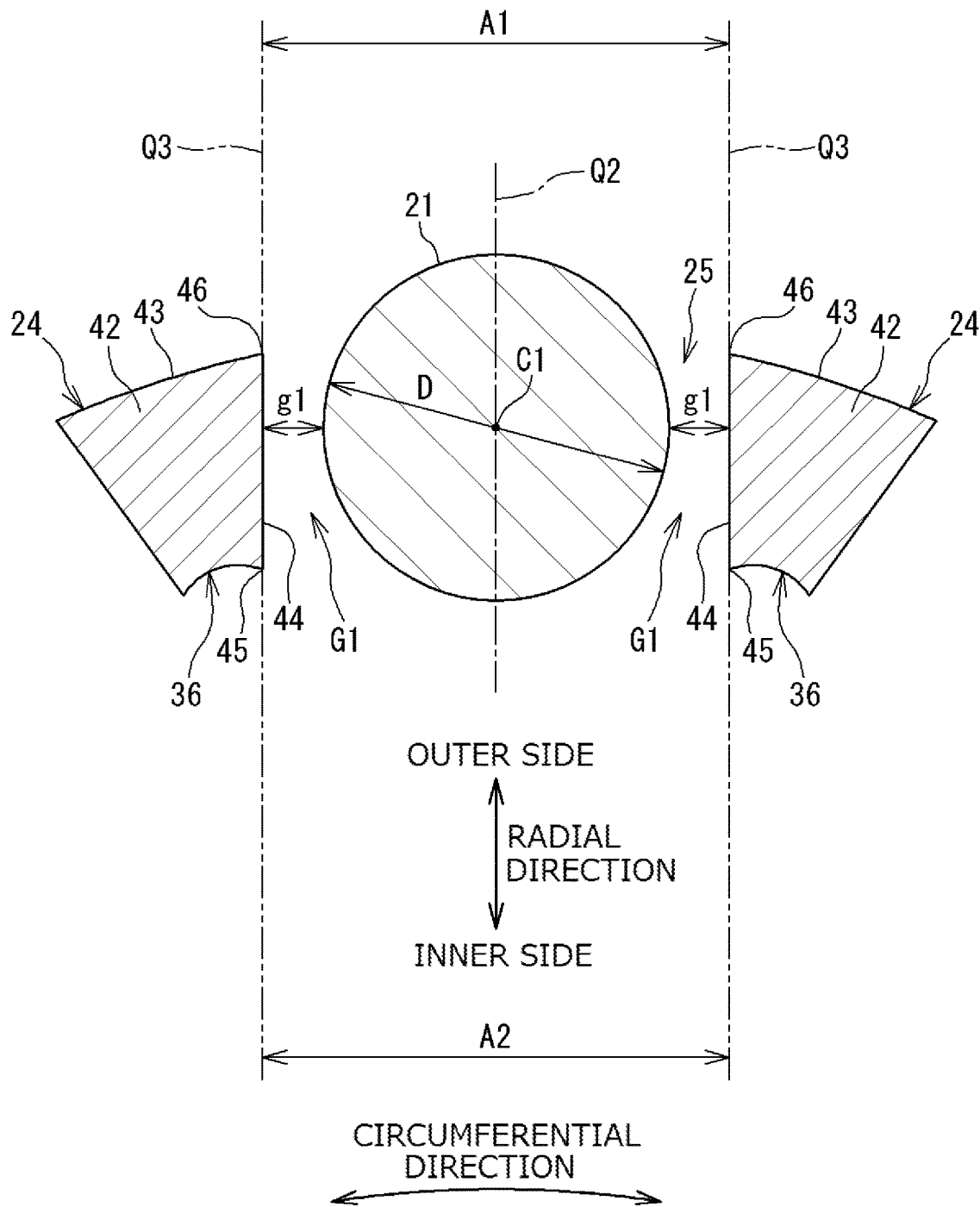
FIG. 4 is a sectional view of cage bars at their cage bar bodies.
Figure 5:
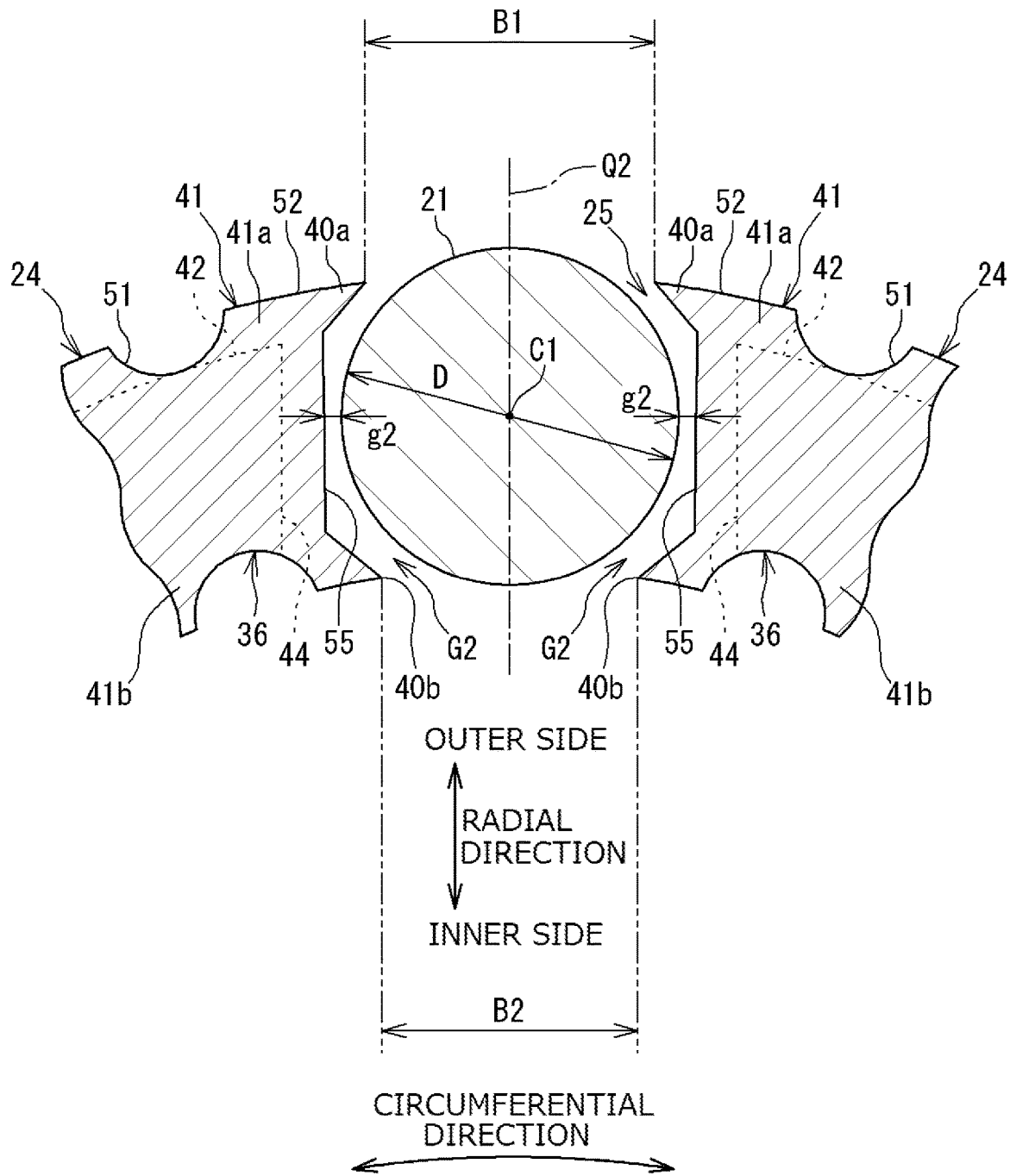
FIG. 5 is a sectional view of the cage bars at their detachment preventing portions.

As described above, an axial center portion of the cage bar 24 that is located between the two ends (detachment preventing portions 41 and 41) is the cage bar body 42. A large clearance G1 (see FIG. 4) is formed between the cage bar body 42 and the roller 21. A clearance G2 (see FIG. 5) smaller than the clearance G1 is formed between the detachment preventing portion 41 and the roller 21. Therefore, when the roller 21 and the cage 22 move relative to each other, the roller 21 is brought into contact with the detachment preventing portions 41 and 41, but is kept out of contact with the cage bar body 42. FIG. 4 is a sectional view of the cage bars 24 at their cage bar bodies 42. FIG. 5 is a sectional view of the cage bars 24 at their detachment preventing portions 41.

As illustrated in FIG. 2 and FIG. 5, each detachment preventing portion 41 has outer claws 40a on its radially outer portion 41a. The outer claw 40a protrudes radially outward with respect to the cage bar body 42, and also protrudes in the circumferential direction. Since the outer claw 40a protrudes in the circumferential direction, the radially outer portion 41a has a shape that expands in the circumferential direction as compared to the cage bar body 42. The detachment preventing portion 41 also has inner claws 40b on its radially inner portion 41b. The inner claw 40b protrudes in the circumferential direction. Since the inner claw 40b protrudes in the circumferential direction, the radially inner portion 41b has a shape that expands in the circumferential direction as compared to the cage bar body 42. A distance B1 between the outer claw 40a on one side in the circumferential direction and the outer claw 40a on the other side in the circumferential direction across the pocket 25 is smaller than a diameter D of the roller 21 (B1<D). A distance B2 between the inner claw 40b on one side in the circumferential direction and the inner claw 40b on the other side in the circumferential direction across the pocket 25 is smaller than the diameter D of the roller 21 (B2<D). The roller 21 is interposed, with a distance, between the outer claw 40a and the inner claw 40b located on the radially inner side of the outer claw 40a. Therefore, the roller 21 does not detach radially outward or radially inward from the pocket 25. In order to house the roller 21 in the pocket 25, the roller 21 is moved closer to the pocket 25 from the radially outer side, and is pressed to elastically deform the outer claw 40a. As illustrated in FIG. 2, a recess 47 is provided between the outer claw 40a and the annular portion 23, and the outer claw 40a is not continuous with the annular portion 23 (not connected to the annular portion 23). This structure facilitates the elastic deformation of the outer claw 40a.

The radially outer portion 41a including the outer claws 40a protrudes radially outward with respect to the oil reservoir bottom face 43 of the cage bar body 42. The protruding region falls within the range of the detachment preventing portion 41, and the axial length of the protruding region is J2. In this embodiment, the radially outer portion 41a including the outer claws 40a and the radially inner portion 41b including the inner claws 40b have the same axial length.

As illustrated in FIG. 4, the sectional shape of each cage bar body 42 (sectional shape in cross section orthogonal to the axial direction) is a trapezoidal shape having a long side located on its radially outer side. The radially outer surface of the cage bar body 42 serves as the oil reservoir bottom face 43 located on the radially inner side with respect to the guide surface 31 (see FIG. 2). The function of the oil reservoir bottom face 43 is described later. As illustrated in FIG. 3, a space K is formed between the oil reservoir bottom face 43 and the outer raceway surface 19 of the planetary gear 10. The lubricating oil can be stored in the space K.

FIG. 4 and FIG. 5 illustrate a state in which a central axis of a pitch diameter of a set of the rollers 21 coincides with a central axis of the cage 22 and the roller 21 (central axis C1 of the roller 21) is located at a middle point in the circumferential direction between a pair of circumferentially adjacent cage bars 24 (in the pocket 25). This state is referred to as "reference state". When the cage 22 and the roller 21 in the reference state move relative to each other in the circumferential direction, the roller 21 is brought into contact with a part of the cage bar 24. The part of the cage bar 24 where the roller 21 is brought into contact is the detachment preventing portion 41. Even through the relative movement, the roller 21 is not brought into contact with the cage bar body 42. That is, if the roller 21 is skewed or advances with a delay in the pocket 25 of the cage 22, the roller 21 is brought into contact with the detachment preventing portion 41 at an axial end. The posture of the roller 21 is maintained at both axial ends. Thus, the posture of the roller 21 is stable in the pocket 25.

The cage and roller assembly 20 of this embodiment has a first axial guide structure. With the first axial guide structure, the lubricating oil supplied through the opening 18a on the inner raceway surface 18 of the shaft 13 (see FIG. 1) is guided to both sides in the axial direction along the radially inner surface of the cage 22 and is supplied to the faces (27, 29) on both sides in the axial direction. The cage and roller assembly 20 of this embodiment also has a radial guide structure. With the radial guide structure, the lubricating oil supplied through the opening 18a passes radially outward through a space between the cage bar 24 of the cage 22 and the roller 21 and is supplied to the space K (see FIG.

3) between the cage bar 24 and the planetary gear 10. The cage and roller assembly 20 of this embodiment also has a second axial guide structure. With the second axial guide structure, the lubricating oil in the space K is supplied to a space between the guide surface 31 of the annular portion 23 and the inner peripheral surface 32 of the planetary gear 10. The guide structures are described below.

The first axial guide structure is described below. As illustrated in FIG. 2 and FIG. 3, an inner recessed groove 36 is formed on a radially inner surface 35 of each cage bar 24. The inner recessed groove 36 is provided over the total length of the cage bar 24, and is also formed on the inner peripheral surface 33 of each annular portion 23. The radially inner surface 35 and the inner peripheral surface 33 have shapes conforming to a common imaginary cylindrical surface. The inner recessed groove 36 continues from the radially inner surface 35, and extends through the inner peripheral portion of the annular portion 23 (portion including the inner peripheral surface 33) in the axial direction. Therefore, the inner recessed groove 36 is open at the second face 29. The position on the second face 29 where the inner recessed groove 36 is open corresponds to an open end 37. In this embodiment, the radially inner surface 35 of the cage bar body 42 is an imaginary surface because the inner recessed groove 36 is formed over the substantially entire radially inner surface 35.

Figure 6:
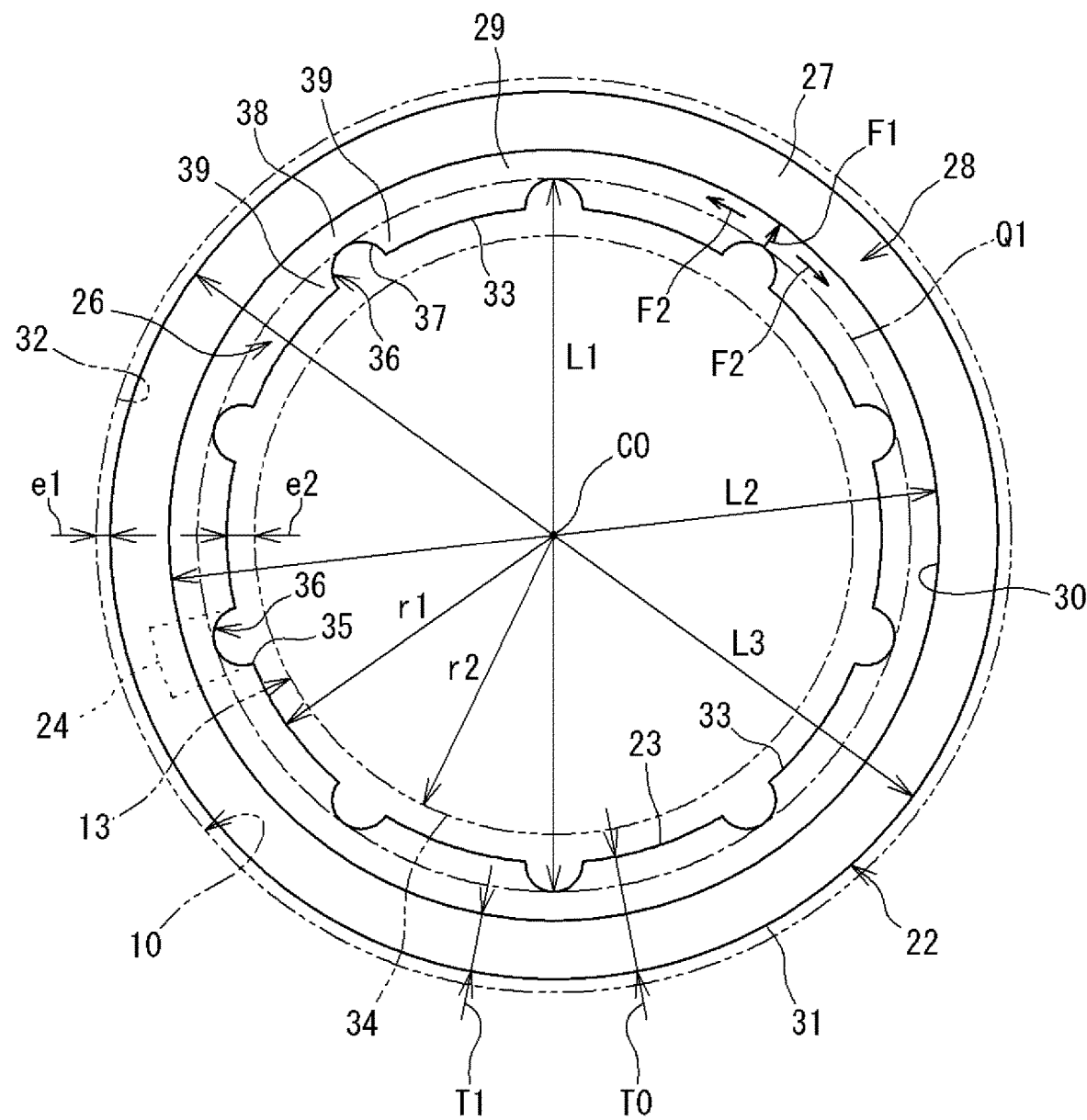
FIG. 6 is an illustration of the cage that is viewed from an axially outer side.

FIG. 6 is an illustration of the cage 22 that is viewed from the axially outer side. In FIG. 6, the inner peripheral surface 32 of the planetary gear 10 and the outer peripheral surface 34 of the shaft 13 are represented by long dashed double-short dashed lines. The groove shape (sectional shape) of each inner recessed groove 36 is an arc shape. The groove shape of the inner recessed groove 36 on the second face 29 (open end 37) is also an arc shape. The long dashed short dashed line illustrated in FIG. 6 represents an imaginary circumscribed circle Q1 passing through groove bottoms of the plurality of inner recessed grooves 36. A diameter L2 of the inner peripheral surface 30 of the annular protrusion 28 is larger than a diameter L1 of the imaginary circumscribed circle Q1 (L2>L1). Therefore, the second face 29 has (first) flat surface portions 39 on both sides of the open end 37 of each inner recessed groove 36 in the circumferential direction, and a (second) flat surface portion 38 on a radially outer side of the open end 37. The diameter L1 and the diameter L2 are values on the second face 29. The groove shape of the inner recessed groove 36 may be a shape other than the arc shape.

A radial dimension T1 of the first face 27 of the annular protrusion 28 is 50% or more of a radial dimension T0 of the annular portion 23. The upper limit of the radial dimension T1 is 75% of the radial dimension T0. That is, the radial dimension T1 is 50% or more and 75% or less of the radial dimension T0. The radial dimension T1 of the first face 27 corresponds to a difference between the radius of the outer peripheral surface (guide surface) 31 of the annular portion 23 and the radius of the inner peripheral surface 30 of the annular protrusion 28. The radial dimension T0 of the annular portion 23 corresponds to a difference between the radius of the outer peripheral surface (guide surface) 31 and the radius of the inner peripheral surface 33.

A specific example of the size of the cage and roller assembly 20 is described. In this embodiment, an outside diameter L3 of the cage 22 (outside diameter of the annular portion 23) is 10 millimeters. The radial dimension T1 of the first face 27 of the annular protrusion 28 is 1 millimeter. The size of the cage 22 (outside diameter L3) may be changed to any value. Even if the size of the cage 22 is changed, the radial dimension T1 of the first face 27 is preferably 1 millimeter or larger. That is, L3−L2 is preferably 2 millimeters or larger (L3−L2≥2 millimeters).

As described above (see FIG. 3), the radially inner surface 35 of the cage bar 24 and the inner peripheral surface 33 of the annular portion 23 have shapes conforming to the common imaginary cylindrical surface. A difference (r1−r2) between a radius r1 of an imaginary inscribed circle passing through the radially inner surfaces 35 of the cage bars 24 and a radius r2 of the shaft 13 is a value equal to that of the clearance e2. The difference (r1−r2) between the radius r1 of the imaginary inscribed circle and the radius r2 of the shaft 13 is 0.5 millimeters or smaller. That is, the clearance e2 formed between the radially inner surface 35 of the cage bar 24 and the shaft 13 is larger than the clearance e1 on the planetary gear 10 side (see FIG. 3 and FIG. 6), but is 0.5 millimeters or smaller (e2≤0.5 millimeters). Thus, the clearance e2 is small.

As described above, the cage 22 (see FIG. 2 and FIG. 3) provided in the cage and roller assembly 20 of this embodiment has the inner recessed grooves 36. The inner recessed groove 36 is provided on the radially inner surface 35 of each cage bar 24, and extends through each annular portion 23 (its inner peripheral portion) in the axial direction. According to the cage and roller assembly 20, the lubricating oil supplied through the oil supply holes 16 and 17 that are open at the inner raceway surface 18 of the shaft 13 (see FIG. 1) is guided in the axial direction through the inner recessed grooves 36 to reach the faces 27 and 29 of the annular portions 23. Therefore, even if the cage 22 is brought into contact with the side washer 15 located axially adjacent to the cage 22, a temperature increase can be suppressed and a frictional resistance can be reduced by the lubricating oil that reaches the face 27 of the annular portion 23.

The cage 22 has the annular recesses 26 and the annular protrusions 28 at the axial ends. The annular recess 26 is provided on the axially outer side and the radially inner side of the annular portion 23, and the inner recessed groove 36 is open at the annular recess 26. The annular protrusion 28 is provided on the radially outer side of the annular recess 26, and has the first face 27 that may be brought into contact with the side washer 15 located axially adjacent to the cage 22. With this structure, the lubricating oil guided in the axial direction through the inner recessed groove 36 enters the annular recess 26, and is stored in the annular recess 26. The lubricating oil in the annular recess 26 can gradually enter a space between the first face 27 and the side washer 15, and is used for lubrication. Since the lubricating oil is stored in the annular recess 26, the lubricity between the cage 22 and the side washer 15 can be stabilized over a long period.

As illustrated in FIG. 6, the diameter L2 of the inner peripheral surface 30 of the annular protrusion 28 is larger than the diameter L1 of the imaginary circumscribed circle Q1 passing through the groove bottoms of the inner recessed grooves 36 (L2>L1). Therefore, the second face 29 where the inner recessed grooves 36 are open has the flat surface portion 38 on the radially outer side of the open ends 37 of the inner recessed grooves 36. The lubricating oil guided in the axial direction through each inner recessed groove 36 to enter the annular recess 26 is likely to flow radially outward by a centrifugal force. The lubricating oil flows radially outward along the flat surface portion 38 as indicated by an arrow F1 in FIG. 6, and impinges on the inner peripheral surface 30 of the annular protrusion 28 to flow while the direction is changed to the circumferential direction (arrows F2 in FIG. 6). Thus, in the cage 22 of this embodiment, the lubricating oil is easily stored in the annular recess 26.

In order to store the lubricating oil in the annular recess 26, it is only necessary that the inner recessed grooves 36 be open at the second face 29. Although illustration is omitted, the diameter L1 and the diameter L2 may be equal to each other (L1=L2). However, L2>L1 is preferable as in this embodiment. If the diameter L1 and the diameter L2 are equal to each other (L1=L2), the first flat surface portions 39 are formed on the second face 29 on both sides of each open end 37 in the circumferential direction. However, the flat surface portion 38 is not formed on the radially outer side of the open end 37. If the flat surface portion 38 is not formed on the radially outer side of the open end 37, a part of the lubricating oil supplied through the inner recessed groove 36 is likely to flow directly toward the first face 27 via the inner peripheral surface 30 of the annular protrusion 28 before the lubricating oil is stored in the annular recess 26. Thus, L2>L1 (L2≠L1) is preferable in order that the lubricating oil that reaches the annular recess 26 through the inner recessed groove 36 is caused to flow (spread: arrows F2) in the circumferential direction to enhance the function of storing the lubricating oil in the annular recess 26.

In this embodiment, the radial dimension T1 of the first face 27 of the annular protrusion 28 is 50% or more of the radial dimension T0 of the annular portion 23. According to this structure, the first face 27 that may be brought into contact with the side washer 15 (see FIG. 3) is not narrow. That is, the contact area between the annular portion 23 and the side washer 15 is secured in the annular portion 23. Particularly in this embodiment, a problem arises in terms of wear of the cage 22 due to the contact between the cage 22 and the side washer 15 if the cage 22 is formed of a resin and the side washer 15 is formed of a metal. The structure described above suppresses the wear of the cage 22 (annular portion 23).

In this embodiment (see FIG. 3 and FIG. 6), the difference (r1−r2) between the radius r1 of the imaginary inscribed circle passing through the radially inner surfaces 35 of the cage bars 24 and the radius r2 of the shaft 13 is 0.5 millimeters or smaller. According to this structure, the clearance e2 formed between the radially inner surface 35 of the cage bar 24 and the shaft 13 is small. Therefore, the lubricating oil passing through the inner recessed groove 36 is covered with the outer peripheral surface 34 of the shaft 13 from the radially inner side. The space formed between the inner recessed groove 36 and the outer peripheral surface 34 of the shaft 13 serves as a passage of the lubricating oil. Through the passage, the lubricating oil is guided in the axial direction. Thus, the lubricating oil reaches the faces 27 and 29 of the annular portions 23 more easily.

As described above, in the first axial guide structure including the inner recessed grooves 36, the lubricating oil supplied through the opening 18a on the inner raceway surface 18 (see FIG. 1) can be guided to both sides in the axial direction along the radially inner surface of the cage 22 and supplied to the faces (27, 29) on both sides in the axial direction. Therefore, a sliding resistance between the cage 22 and the side washer 15 can be reduced, and heat generation can be suppressed. Thus, the cage and roller assembly 20 can have high rotation performance. In this embodiment, the cage and roller assembly 20 having the structure described above is used in the support structure 9 that supports the planetary gear 10 (see FIG. 1). Thus, the temperature increase can be suppressed in the cage and roller assembly 20. Further, the torque of the planetary gearing mechanism can be reduced because the frictional resistance is reduced.

The radial guide structure is described below. FIG. 4 is a sectional view of the cage bars 24 at their cage bar bodies 42. FIG. 5 is a sectional view of the cage bars 24 at their detachment preventing portions 41. In FIG. 4, the first clearance G1 is formed between the cage bar body 42 and the roller 21 located circumferentially adjacent to the cage bar body 42 in the reference state. In FIG. 5, the second clearance G2 is formed between the detachment preventing portion 41 and the roller 21 located circumferentially adjacent to the detachment preventing portion 41 in the reference state.

In FIG. 4 and FIG. 5, the long dashed short dashed line represents an imaginary plane Q2 passing through the central axis of the cage 22 and the central axis C1 of the roller 21. In FIG. 4, the long dashed double-short dashed line represents an imaginary reference plane Q3 parallel to the imaginary plane Q2. In the form illustrated in FIG. 4, a face 44 of the cage bar body 42 is provided along the imaginary reference plane Q3. The minimum value of the clearance G1 is a minimum distance g1 from the imaginary reference plane Q3 to the roller 21. As illustrated in FIG. 5, the detachment preventing portion 41 has a second face 55 located on the roller 21 side with respect to the face (first face) 44 of the cage bar body 42. Therefore, the clearance G2 is smaller than the clearance G1. More specifically, assuming that the minimum value (minimum distance) of the clearance G2 formed between the detachment preventing portion 41 and the roller 21 is g2, the minimum value g2 is smaller than the minimum value (g1) of the clearance G1 (g2<g1). That is, the clearance (minimum value) formed between the cage bar 24 and the roller 21 located circumferentially adjacent to the cage bar 24 is larger in the cage bar body 42 at the axial center portion of the cage bar 24 than in the detachment preventing portions 41 provided at both axial ends of the cage bar 24. The minimum distance g1 is preferably set to 0.3 millimeters or larger. The maximum value of the minimum distance g1 is 1 millimeter.

In FIG. 4, "A1" represents a distance between a radially outer end 46 of the cage bar body 42 provided in one cage bar 24 and a radially outer end 46 of the cage bar body 42 provided in the other cage bar 24 out of the pair of circumferentially adjacent cage bars 24 and 24. "A2" represents a distance between a radially inner end 45 of the cage bar body 42 provided in the one cage bar 24 and a radially inner end 45 of the cage bar body 42 provided in the other cage bar 24 out of the pair of cage bars 24 and 24. In the form illustrated in FIG. 4, the faces 44 of the cage bar bodies 42 on both sides are provided along two imaginary reference planes Q3 parallel to the imaginary plane Q2. The distance A1 and the distance A2 are equal to each other (A1=A2). The distance A1 is a circumferential width of the pocket 25 on the radially outer side. The distance A2 is a circumferential width of the pocket 25 on the radially inner side.

Instead of the structure in which the distance A1 and the distance A2 are equal to each other, the distance A2 may be larger than the distance A1 (A2>A1). That is, in the cage bar bodies 42 having large clearances G1 in the pair of circumferentially adjacent cage bars 24 and 24, it is only necessary that the distance A2 between the radially inner ends 45 and 45 be equal to or larger than the distance A1 between the radially outer ends 46 and 46 (A2≥A1).

Figure 7:
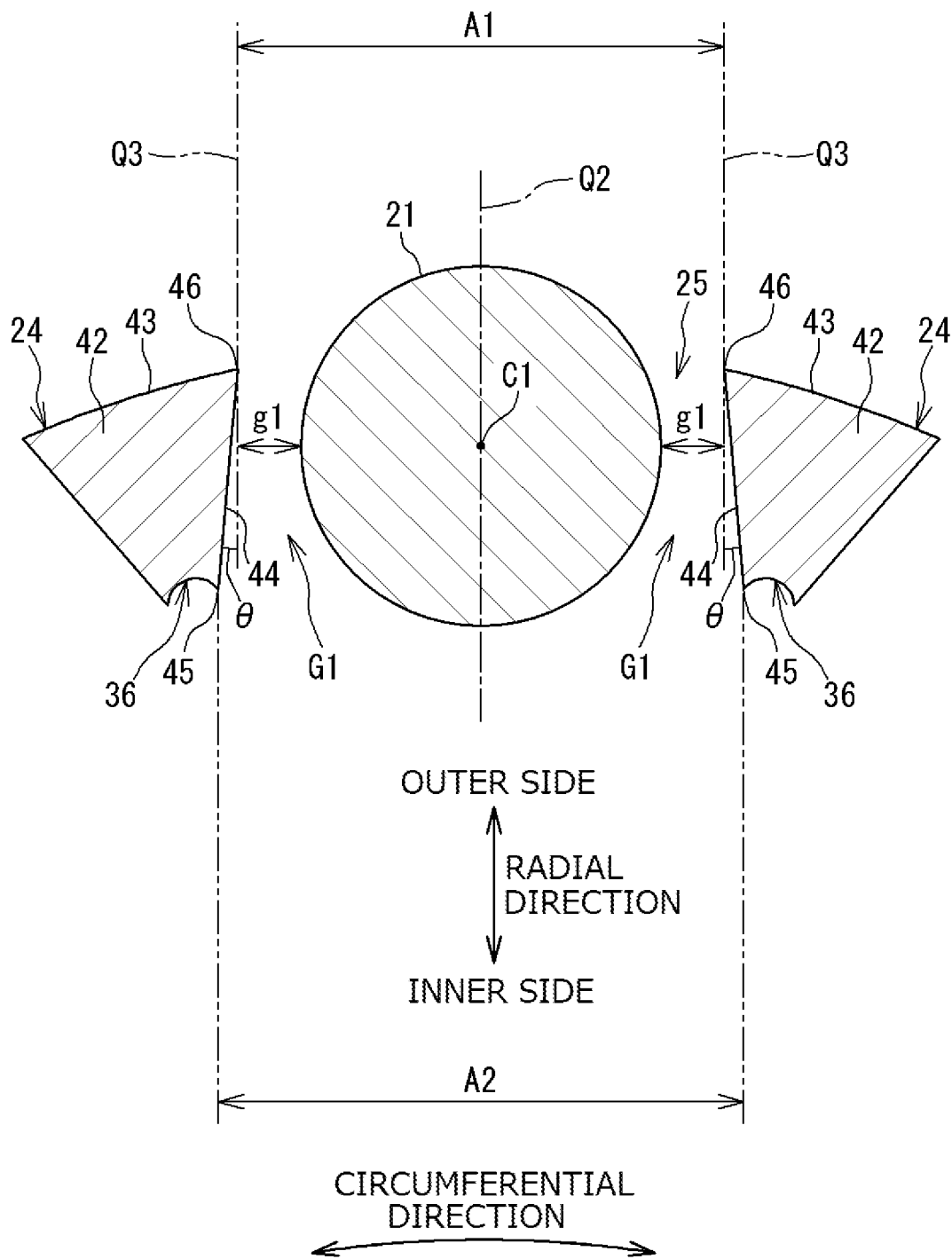
FIG. 7 is a sectional view of cage bars (other form) at their cage bar bodies.

Thus, in the cage and roller assembly 20 of this embodiment, the distance between the cage bar bodies 42 and 42 is increased on the radially inner side. That is, it is only necessary that the minimum value of the distance A2 be the distance A1. In order to increase the distance between the cage bar bodies 42 and 42 on the radially inner side, that is, to increase the distance A2, the faces 44 of the cage bar bodies 42 may be inclined with respect to the imaginary reference planes Q3 as illustrated in FIG. 7. The inclination angle of the face 44 with respect to the imaginary reference plane Q3 is θ (θ>0). In this case, the distance A2 on the radially inner side is larger than the distance A1 on the radially outer side (A2≥A1). Thus, in the cage bar bodies 42 in the form illustrated in FIG. 7, the faces 44 that face the outer peripheral surface of the roller 21 are inclined with respect to the imaginary reference planes Q3. In each cage bar 24 in the forms illustrated in FIG. 4 and FIG. 7, an intersection line obtained through intersection of extension planes of the faces 44 on both sides in the circumferential direction is located on the radially outer side with respect to the central axis of the cage 22.

Figure 8:
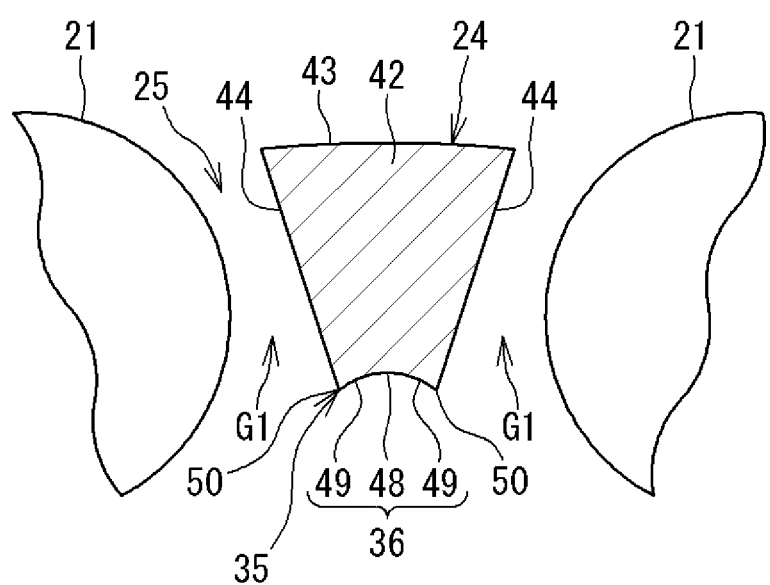
FIG. 8 is a sectional view illustrating an axial center portion of the cage bar and rollers.
Figure 9:
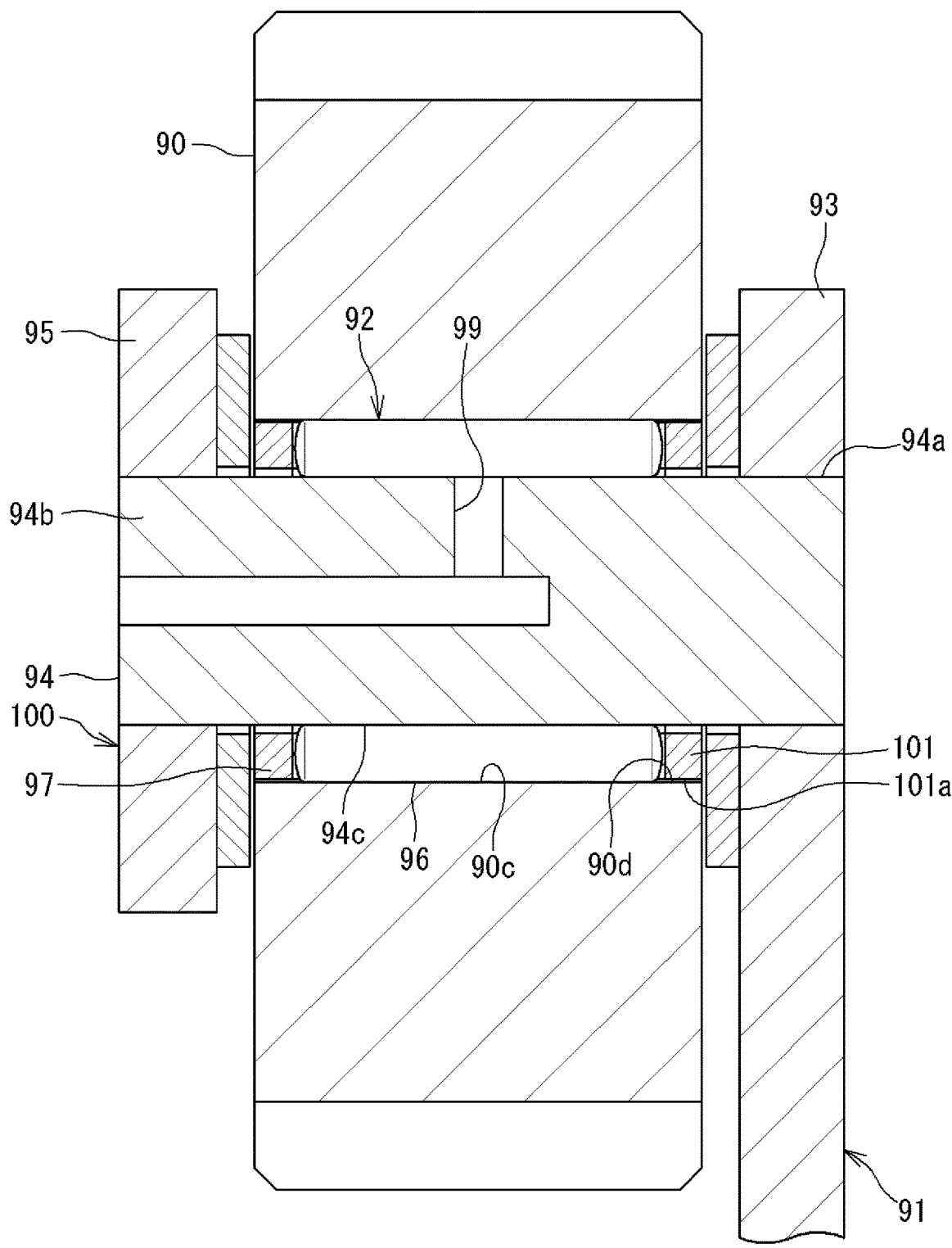
FIG. 9 is a sectional view illustrating a planetary gear and a support structure for the planetary gear according to related art.

FIG. 8 is a sectional view illustrating the axial center portion of the cage bar 24 (that is, the cage bar body 42) and the rollers 21. As described above, the inner recessed groove 36 is formed on the radially inner surface 35 of the cage bar body 42. The inner recessed groove 36 has a groove bottom face 48 and groove side faces 49. The groove bottom face 48 is a face on a deep side (radially outer side) of the inner recessed groove 36. The groove side face 49 is a face extending radially inward from the groove bottom face 48. In the case of this embodiment, the groove shape of the inner recessed groove 36 is the arc shape, and the groove bottom face 48 smoothly continues with the groove side faces 49 and 49 on both sides of the groove bottom face 48. In the cage bar body 42, the groove width of the inner recessed groove 36 is (substantially) equal to the circumferential width dimension of the radially inner surface 35. The groove width of the inner recessed groove 36 is a maximum distance between the groove side faces 49 and 49. An acute apex 50 is interposed between one groove side face 49 and one face 44 of the cage bar body 42. An acute apex 50 is also interposed between the other groove side face 49 and the other face 44 of the cage bar body 42. The face 44 and the groove side face 49 intersect each other at an acute angle. The intersecting portion (apex 50) may be chamfered or rounded. In this case, the extension plane of the face 44 and an extension plane of the groove side face 49 intersect each other at an acute angle. Thus, in the cage bar body 42, the face 44 that faces the outer peripheral surface of the roller 21 and the groove side face 49 of the inner recessed groove 36 continue with each other via the acute apex 50.

As described above, in the cage and roller assembly 20 of this embodiment (see FIG. 4 and FIG. 5), the clearance (minimum value) formed between the cage bar 24 and the roller 21 housed in the pocket 25 is larger in the axial center portion (cage bar body 42; see FIG. 4) between the axial ends (detachment preventing portions 41; see FIG. 5) than at the axial ends (G1>G2).

When the cage and roller assembly 20 rotates, the guide surface 31 of the annular portion 23 provided in the cage 22 may be brought into contact with the inner peripheral surface 32 of the planetary gear 10. Therefore, it is necessary to supply the lubricating oil to the space between the guide surface 31 and the inner peripheral surface 32 of the planetary gear 10. In this embodiment (see FIG. 1), the lubricating oil is supplied to the cage and roller assembly 20 from the shaft 13 side on its inner periphery. In the cage and roller assembly 20 of this embodiment, the lubricating oil supplied through the oil supply hole (second hole 17) that is open at the axial center region of the inner raceway surface 18 of the shaft 13 can flow radially outward through the space between the cage bar 24 and the roller 21. As described above, the clearance formed between the cage bar 24 and the roller 21 is large in the axial center portion. Therefore, the lubricating oil supplied through the oil supply hole (second hole 17) easily reaches an outer peripheral side of the cage 22.

More specifically, in this embodiment (see FIG. 2), each cage bar 24 has the detachment preventing portions 41 on both sides in the axial direction. The detachment preventing portion 41 has the outer claw 40a and the inner claw 40b between which the end of the roller 21 is interposed with a distance on the radially outer side and the radially inner side. The lubricating oil hardly flows in the radial direction through a space between the detachment preventing portion 41 and the roller 21 due to the outer claw 40a and the inner claw 40b. In this embodiment, the clearance formed between the roller 21 and the cage bar body 42 excluding the detachment preventing portion 41 (see FIG. 4) is larger than the clearance formed between the roller 21 and the detachment preventing portion 41 (see FIG. 5) as described above (G1>G2). Therefore, the lubricating oil supplied through the oil supply hole (second hole 17) that is open at the axial center region of the shaft 13 (see FIG. 1) easily reaches the outer peripheral side of the cage 22.

As described above, even when the lubricating oil is supplied to the inner peripheral side of the cage and roller assembly 20, the lubricating oil easily reaches the outer peripheral side of the cage 22 (space K; see FIG. 3) by passing through the cage 22 in the radial direction. Then, the lubricating oil is supplied to the space between the guide surface 31 and the inner peripheral surface 32 of the planetary gear 10. Thus, the cage and roller assembly 20 can have high rotation performance.

The cage bar body 42 is longer in the axial direction than the sum of the axial lengths (J2; see FIG. 2) of the detachment preventing portions 41 located on both sides in the axial direction (J1>2×J2). Therefore, the range in which the clearance from the roller 21 is large is wide in the axial direction. Thus, the lubricating oil supplied through the oil supply hole (second hole 17) easily reaches the outer peripheral side of the cage 22.

In this embodiment, each detachment preventing portion 41 is provided with an outer recessed groove 51 as illustrated in FIG. 2 though description is given later in the second axial guide structure. The outer recessed groove 51 serves as a passage for causing the lubricating oil to flow toward the guide surface 31 of the annular portion 23 from the oil reservoir bottom face 43 through the radially outer portion 41a of the detachment preventing portion 41. With the outer recessed groove 51, the lubricating oil stored in the space between the oil reservoir bottom face 43 and the inner peripheral surface 32 of the planetary gear 10 (space K; see FIG. 3) is easily supplied to the guide surface 31 through the outer recessed groove 51.

In the axial center portions (cage bar bodies 42) having large clearances G1 (see FIG. 4 and FIG. 7) in the pair of circumferentially adjacent cage bars 24 and 24, the distance A2 between the radially inner ends 45 and 45 is equal to or larger than the distance A1 between the radially outer ends 46 and 46 (A2≥A1). According to this structure, the radially inner opening of the pocket 25 is widened. Therefore, the lubricating oil supplied from the shaft 13 side is easily received on the inner peripheral side of the cage 22. As a result, the lubricating oil reaches the outer peripheral side of the cage 22 more easily.

Particularly in the form illustrated in FIG. 7, the faces 44 are inclined with respect to the imaginary reference planes Q3 in the axial center portions (cage bar bodies 42) having large clearances G1. With this structure, the distance A2 is larger than the distance A1 (A2>A1) in the axial center portions (cage bar bodies 42) having large clearances G1 in the pair of circumferentially adjacent cage bars 24 and 24. That is, the radially inner opening of the pocket 25 is wider than the radially outer opening of the pocket 25. Thus, the lubricating oil supplied from the shaft 13 side is received on the inner peripheral side of the cage 22 more easily.

In FIG. 7, the inclination angle of the face 44 with respect to the imaginary reference plane Q3 is θ. If the inclination angle θ increases, it is possible to enhance the performance of the cage 22 that receives the lubricating oil into each pocket 25. If the inclination angle θ increases excessively, however, the sectional area of each cage bar body 42 decreases, and the strength may decrease. Although illustration is omitted, the cage 22 is manufactured by injection molding that uses a split mold. The split mold includes mold parts configured to move in the radial direction (radially) in order to form the pockets 25. If the inclination angle θ increases, the mold parts may be difficult to move in the radial direction during mold removal (need to be removed forcibly). Thus, the upper limit value of θ is preferably about 5° (0≤θ<5°).

In this embodiment, the inner recessed grooves 36 are provided on the inner peripheral side of the cage 22. As described with reference to FIG. 8, in the cage bar body 42, the face 44 that faces the outer peripheral surface of the roller 21 and the groove side face 49 of the inner recessed groove 36 continue with each other via the acute apex 50. According to this structure, if a part of the lubricating oil flows out of the inner recessed groove 36 during the rotation of the cage and roller assembly 20, the part of the lubricating oil can immediately flow radially outward along the face 44 via the acute apex 50 by the centrifugal force. As a result, the part of the lubricating oil easily reaches the outer peripheral side of the cage 22. That is, the lubricating oil flowing out of the inner recessed groove 36 can easily flow radially outward along the face 44.

As described above, in the radial guide structure including the structure in which the clearance G1 (see FIG. 4 and FIG. 7) between the roller 21 and the axial center portion (cage bar body 42) of the cage bar 24 provided in the cage 22 is increased, the lubricating oil supplied from the inner peripheral side of the cage and roller assembly 20 can be supplied to the space K (see FIG. 3) between the cage bar 24 and the inner peripheral surface 32 of the planetary gear 10 by passing radially outward through the space between the cage bar 24 and the roller 21. Then, the lubricating oil is supplied to the space between the guide surface 31 and the inner peripheral surface 32 of the planetary gear 10. Thus, a sliding resistance can be reduced, and heat generation can be suppressed. Accordingly, the cage and roller assembly 20 can have high rotation performance.

The second axial guide structure is described below. As described above (see FIG. 3), the cage 22 is provided with the oil reservoir bottom face 43 on the radially outer side of each cage bar body 42. The lubricating oil is stored in the space K between the oil reservoir bottom face 43 and the inner peripheral surface 32 of the planetary gear 10. The radially outer portion 41a of each detachment preventing portion 41 is provided between the oil reservoir bottom face 43 and the guide surface 31 of the annular portion 23. The radially outer portion 41a is a portion that protrudes toward the inner peripheral surface 32 of the planetary gear 10 with respect to the oil reservoir bottom face 43. Therefore, the radially outer portion 41a is an obstacle to the lubricating oil that is stored in the space K and is likely to flow toward the guide surface 31. In view of this, the radially outer portion 41a is provided with the outer recessed groove 51 as the passage for causing the lubricating oil to flow toward the guide surface 31 from the space K (see FIG. 2 and FIG. 3). The groove shape (sectional shape) of the outer recessed groove 51 of this embodiment is an arc shape. The groove shape of the outer recessed groove 51 may be a shape other than the arc shape.

In the cage bar 24, the oil reservoir bottom face 43 and the outer recessed groove 51 are continuously provided side by side in the axial direction. The outer recessed groove 51 and the annular portion 23 are also continuously provided side by side in the axial direction. The oil reservoir bottom face 43 and a bottom 51a (see FIG. 3) of the outer recessed groove 51 are located at the same position in the radial direction. The guide surface 31 is located on the radially outer side with respect to the bottom 51a of the outer recessed groove 51. In the range of the outer recessed groove 51, an inclined surface 53 is provided between the bottom 51a and the guide surface 31. That is, the inclined surface 53 is a surface connected to the guide surface 31 from the bottom 51a of the outer recessed groove 51. The inclined surface 53 is a surface extending radially outward with decreasing distance from the annular portion 23.

Description is given of the radially outer portion 41a having the outer recessed groove 51. The radially outer portion 41a has the outer claws 40a. The outer claw 40a is located on the radially outer side with respect to the oil reservoir bottom face 43, and protrudes in the circumferential direction to cover a part of the roller 21 from the radially outer side. Thus, the radially outer portion 41a including the outer claws 40a is located relatively on the radially outer side, but its position is limited. That is, a radially outer surface 52 of the radially outer portion 41a is located on the radially inner side with respect to the guide surface 31. The outer recessed groove 51 is recessed from the radially outer surface 52.

As described above, the cage and roller assembly 20 of this embodiment has the following structure. For example, when the cage 22 and the rollers 21 are transported as a unit, it is necessary that the rollers 21 be prevented from detaching from the pockets 25 of the cage 22. In view of this, the detachment preventing portions 41 are provided on both sides of each cage bar 24 of the cage 22 in the axial direction. The detachment preventing portion 41 has the outer claw 40a that covers a part of the roller 21 from the radially outer side. In order to guide the rotation of the cage 22, the guide surface 31 of each annular portion 23 may be brought into contact with the inner peripheral surface 32 of the planetary gear 10. Therefore, it is necessary to supply the lubricating oil to the space between the guide surface 31 and the inner peripheral surface 32 of the planetary gear 10. The cage bar body 42 of the cage bar 24 has the oil reservoir bottom face 43 on its radially outer side. The oil reservoir bottom face 43 is located on the radially inner side with respect to the guide surface 31. According to this structure, the lubricating oil is stored in the space between the oil reservoir bottom face 43 and the inner peripheral surface 32 of the planetary gear 10. In the cage and roller assembly 20, the detachment preventing portions 41 are provided on both sides of the oil reservoir bottom face 43 in the axial direction. The detachment preventing portion 41 may keep the lubricating oil stored on the oil reservoir bottom face 43 from being supplied to the guide surface 31.

As the second axial guide structure, each detachment preventing portion 41 is provided with the outer recessed groove 51. The outer recessed groove 51 constitutes the passage for causing the lubricating oil to flow toward the guide surface 31 from the oil reservoir bottom face 43 through the radially outer portion 41a of the detachment preventing portion 41. Therefore, the lubricating oil stored in the space between the oil reservoir bottom face 43 and the inner peripheral surface 32 of the planetary gear 10 is supplied to the guide surface 31 through the outer recessed groove 51. As a result, the cage and roller assembly 20 can have high rotation performance.

As described above, in the cage and roller assembly 20 of this embodiment, the lubricating oil is supplied through the oil supply hole (second hole 17) that is open at the axial center region of the inner raceway surface 18 provided in the shaft 13 (see FIG. 1). The lubricating oil supplied through the oil supply hole (second hole 17) can flow radially outward through the space between the cage bar 24 of the cage 22 and the roller 21. As described in the radial guide structure, the clearance (minimum value) formed between the cage bar 24 and the roller 21 housed in the pocket 25 is larger in the cage bar body 42 at the center in the axial direction than in the detachment preventing portions 41 on both sides in the axial direction. Therefore, the lubricating oil supplied through the oil supply hole (second hole 17) easily reaches the outer peripheral side of the cage 22 through the space between the cage bar body 42 and the roller 21. As described above, even when the lubricating oil is supplied to the inner peripheral side of the cage and roller assembly 20, the lubricating oil can reach the outer peripheral side of the cage 22 by passing through the cage 22 in the radial direction. The lubricating oil is stored in the space between the oil reservoir bottom face 43 and the inner peripheral surface 32 of the planetary gear 10. Then, the stored lubricating oil is supplied to the guide surface 31 through the outer recessed groove 51.

As illustrated in FIG. 3, the oil reservoir bottom face 43 and the bottom 51a of the outer recessed groove 51 are located at the same position in the radial direction. That is, the oil reservoir bottom face 43 and the bottom 51a of the outer recessed groove 51 are located collinearly. Therefore, the lubricating oil stored in the space between the oil reservoir bottom face 43 and the inner peripheral surface 32 of the planetary gear 10 easily flows along the bottom 51a from the oil reservoir bottom face 43, that is, easily enters the outer recessed groove 51. The outer recessed groove 51 has the inclined surface 53 as a groove terminal end face on the axially outer side. The inclined surface 53 has a shape that extends radially outward with decreasing distance from the annular portion 23. Therefore, the lubricating oil present in the outer recessed groove 51 is easily supplied to the guide surface 31.

As described above (see FIG. 2 and FIG. 3), the radially outer surface 52 of the outer claw 40a of the detachment preventing portion 41 is located on the radially inner side with respect to the guide surface 31, and the outer recessed groove 51 is recessed from the radially outer surface 52. With this structure, a part of the lubricating oil in the outer recessed groove 51 is used for lubricating the end of the roller 21. That is, on the periphery of the axial center portion of the roller 21, a relatively large amount of lubricating oil is present owing to the oil reservoir bottom face 43. At the axial end of the roller 21, however, the lubricating oil hardly flows because the detachment preventing portion 41 is provided. Therefore, the amount of the lubricating oil may be smaller at the axial end of the roller 21 than at the axial center portion of the roller 21. According to the structure described above, the lubricating oil is easily guided to the axial end of the roller 21 from the outer recessed groove 51 via the radially outer surface 52 of the outer claw 40a. For example, when the cage 22 rotates at high speed, a part of the lubricating oil present in the outer recessed groove 51 may flow out of the outer recessed groove 51. When the part of the lubricating oil flows out of the outer recessed groove 51 in the circumferential direction, the part of the lubricating oil can pass through a space between the radially outer surface 52 of the outer claw 40a and the inner peripheral surface 32 of the planetary gear 10 according to the structure described above. The part of the lubricating oil passing in this manner is used for lubricating the end of the roller 21. Thus, the lubricity can be increased also at the end of the roller 21.

Another advantage can be attained in the structure in which the radially outer portion 41a provided in the detachment preventing portion 41 is located on the radially inner side with respect to the guide surface 31. As described above, the outer claw 40a is elastically deformed in order to house the roller 21 in the pocket 25 during assembling of the cage and roller assembly 20. When the outer claw 40a is elastically deformed, a part of the outer claw 40a may plastically be deformed beyond its elastic range. As an actual phenomenon, a part of the outer claw 40a may plastically be deformed so as to be warped radially outward even when the roller 21 is inserted into the pocket 25 from the radially outer side while the outer claw 40a is deformed. Even when the part of the outer claw 40a is plastically deformed, the occurrence of a case where the outer claw 40a is located on the radially outer side with respect to the guide surface 31 can be reduced according to the structure described above. Thus, a part of the cage 22 other than the guide surface 31 can be prevented from being brought into contact with the inner peripheral surface 32 of the planetary gear 10.

As described above, in the second axial guide structure including the outer recessed grooves 51, the lubricating oil in the space K (see FIG. 3) is easily supplied to the space between the guide surface 31 and the inner peripheral surface 32 of the planetary gear 10. As a result, the sliding resistance between the guide surface 31 and the inner peripheral surface 32 of the planetary gear 10 can be reduced, and the heat generation can be suppressed. Thus, the cage and roller assembly 20 can have high rotation performance. In this embodiment, the cage and roller assembly 20 having the structure described above is used in the support structure 9 that supports the planetary gear 10 (see FIG. 1). Thus, the temperature increase can be suppressed in the cage and roller assembly 20. Further, the torque of the planetary gearing mechanism can be reduced because the frictional resistance is reduced.

The embodiment disclosed herein is illustrative but is not limitative in all respects. The scope of rights of the present invention is not limited to the embodiment described above, but encompasses all modifications within the scope of structures described in the claims and their equivalents. In the embodiment described above, description is given of the case where the cage and roller assembly 20 is included in the support structure 9 that supports the planetary gear 10 provided in the planetary gearing mechanism. The present invention is not limited to this case. The cage and roller assembly of the present invention is also applicable to other devices.

According to the cage and roller assembly of the present invention, even if the lubricating oil is supplied to the inner peripheral side of the cage and roller assembly, the lubricating oil radially passes through the cage, thereby reaching the outer peripheral side of the cage. Therefore, the lubricating oil is easily supplied to the space between the guide surface and the inner peripheral surface of the outer member.

What is claimed is:

1. A cage and roller assembly, comprising:
a plurality of rollers to be brought into rolling contact with a raceway surface provided on an outer periphery of a shaft; and
an annular cage that retains the rollers,
the cage and roller assembly being supplied with lubricating oil through an oil supply hole that is provided inside the shaft and is open at an axial center region of the raceway surface, wherein
the cage includes:
   a pair of annular portions having guide surfaces that are brought into contact with an inner peripheral surface of an outer member that is brought into rolling contact with the rollers; and
   a plurality of cage bars that couple the pair of annular portions together and are arranged with intervals in a circumferential direction,
the rollers are housed in pockets each formed between the pair of annular portions and between the cage bars that are adjacent to each other in the circumferential direction,
clearances formed between the cage bars and the rollers housed in the pockets are larger in axial center portions of the cage bars between axial ends of the cage bars than at the axial ends of the cage bars, and
in the axial center portions of a pair of the circumferentially adjacent cage bars, which have the larger clearances, a distance between the radially inner ends is equal to or larger than a distance between the radially outer ends.

2. The cage and roller assembly according to claim 1, wherein in each of the axial center portions having the larger clearances, a face of each of the cage bars which faces an outer peripheral surface of the corresponding one of the rollers is inclined with respect to an imaginary reference plane parallel to an imaginary plane passing through a central axis of the cage and a central axis of the roller.

3. The cage and roller assembly according to claim 2, wherein
the cage bar has, at each axial end of the cage bar, a detachment preventing portion including an outer claw and an inner claw between which the end of the roller is interposed with a distance on the radially outer side and the radially inner side, respectively,
the cage bar further has, between the detachment preventing portions at the axial ends of the cage bar, a cage bar body having an oil reservoir bottom face on the radially outer side of the cage bar body, the oil reservoir bottom face located on the radially inner side with respect to the guide surface, and
each of the clearances is larger in the cage bar body than in the detachment preventing portion.

4. The cage and roller assembly according to claim 3, wherein
the detachment preventing portion is provided with an outer recessed groove configured as a passage for causing the lubricating oil to flow toward the guide surface from the oil reservoir bottom face through the detachment preventing portion.

5. The cage and roller assembly according to claim 4, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

6. The cage and roller assembly according to claim 3, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

7. The cage and roller assembly according to claim 2, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

8. A cage and roller assembly, comprising:
a plurality of rollers to be brought into rolling contact with a raceway surface provided on an outer periphery of a shaft; and
an annular cage that retains the rollers,
the cage and roller assembly being supplied with lubrication oil through an oil supply hole that is provided inside the shaft and is open at an axial center region of the raceway surface, wherein
the cage includes:
   a pair of annular portions having guide surfaces that are brought into contact with an inner peripheral surface of an outer member that is brought into rolling contact with the rollers; and
   a plurality of cage bars that couple the pair of annular portions together and are arranged with intervals in a circumferential direction,
the rollers are housed in pockets each formed between the pair of annular portions and between the cage bars that are adjacent to each other in the circumferential direction,
clearances formed between the cage bars and the rollers housed in the pockets are larger in axial center portions of the cage bars between axial ends of the cage bars than at the axial ends of the cage bars,
the cage bar has, at each axial end of the cage bar, a detachment preventing portion including an outer claw and an inner claw between which the end of the roller is interposed with a distance on the radially outer side and the radially inner side, respectively, and
the cage bar further has, between the detachment preventing portions at the axial ends of the cage bar, a cage bar body having an oil reservoir bottom face on the radially outer side of the cage bar body, the oil reservoir bottom face located on the radially inner side with respect to the guide surface, and each of the clearances is larger in the cage bar body than in the detachment preventing portion.

9. The cage and roller assembly according to claim 8, wherein the detachment preventing portion is provided with an outer recessed groove configured as a passage for causing the lubricating oil to flow toward the guide surface from the oil reservoir bottom face through the detachment preventing portion.

10. The cage and roller assembly according to claim 9, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

11. The cage and roller assembly according to claim 8, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

12. A cage and roller assembly, comprising
a plurality of rollers to be brought into rolling contact with a raceway surface provided on an outer periphery of a shaft; and
an annular cage that retains the rollers,
the cage and roller assembly being supplied with lubricating oil through an oil supply hole that is provided inside the shaft and is open at an axial center region of the raceway surface, wherein
the cage includes:
a pair of annular portions having guide surfaces that are brought into contact with an inner peripheral surface of an outer member that is brought into rolling contact with the rollers; and
a plurality of cage bars that couple the pair of annular portions together and are arranged with intervals in a circumferential direction,
the rollers are housed in pockets each formed between the pair of annular portions and between the cage bars that are adjacent to each other in the circumferential direction,
clearances formed between the cage bars and the rollers housed in the pockets are larger in axial center portions of the cage bars between axial ends of the cage bars than at the axial ends of the cage bars,
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

13. The cage and roller assembly according to claim 12, wherein
the cage has an inner recessed groove that is provided on a radially inner surface of the cage bar and extends through the annular portions in an axial direction, and
the face of the cage bar that faces the outer peripheral surface of the roller and a groove side face of the inner recessed groove continue with each other via an acute apex in the axial center portion of the cage bar.

* * * * *